(12) United States Patent
Lohmann et al.

(10) Patent No.: US 6,968,298 B2
(45) Date of Patent: Nov. 22, 2005

(54) SYSTEM FOR AUTOMATICALLY CONFIGURING ARRANGEMENTS OF COMPONENTS AND AUTOMATICALLY GENERATING PRODUCTION DOCUMENTS

(75) Inventors: Hans-Juergen Lohmann, Hamburg (DE); Werner Muehlmeister, Moorrege (DE); Carsten Rasch, Buchholz (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/706,967

(22) Filed: Nov. 14, 2003

(65) Prior Publication Data

US 2004/0153295 A1  Aug. 5, 2004

Related U.S. Application Data

(62) Division of application No. 09/934,907, filed on Aug. 22, 2001.

(30) Foreign Application Priority Data

Aug. 22, 2000  (DE) ............................... 100 41 031

(51) Int. Cl.$^7$ ............................................ G06F 17/50
(52) U.S. Cl. ....................................................... 703/1
(58) Field of Search ..................... 703/1, 13; 700/182; 345/420

(56) References Cited

U.S. PATENT DOCUMENTS

| | | | |
|---|---|---|---|
| 3,867,616 A * | 2/1975 | Korelitz et al. | 703/1 |
| 4,613,866 A * | 9/1986 | Blood | 342/448 |
| 5,945,995 A * | 8/1999 | Higuchi et al. | 345/420 |
| 6,282,547 B1 * | 8/2001 | Hirsch | 707/102 |
| 2002/0026296 A1 | 2/2002 | Lohmann et al. | |

* cited by examiner

*Primary Examiner*—Albert W. Paladini
(74) *Attorney, Agent, or Firm*—Oblon, Spivak, McClelland, Maier & Neustadt, P.C.

(57) ABSTRACT

A system for automatically defining the spatial arrangement of structural components and optimizing the functional positions and/or quantities thereof is useful for design and production of an aircraft cabin. The basic aircraft type is input into a configuration tool of a data processing system. The aircraft-specific geometry is stored in, loaded from and represented by a drawing module of the system. The required components are geometrically defined by stored data and position rules, and are combined with the aircraft-specific geometry in the drawing module. The components and the aircraft-specific geometry are spatially optimally configured relative to each other according to a rule set which accounts for specific customer requirements, in the configuration tool. Production documents such as drawings and parts lists are automatically generated by a document generating tool of the system after inputting project-related data.

48 Claims, 2 Drawing Sheets

SYSTEM FOR AUTOMATICALLY CONFIGURING ARRANGEMENTS OF COMPONENTS AND AUTOMATICALLY GENERATING PRODUCTION DOCUMENTS

PRIORITY CLAIM

This application is a divisional of U.S. application Ser. No. 09/934,907 filed on Aug. 22, 2001, and is based on and claims the priority under 35 U.S.C. § 119 of German Patent Application 100 41 031.6, filed on Aug. 22, 2000, the entire disclosures of each of which are incorporated herein by reference.

FIELD OF THE INVENTION

The invention relates to an automated method of planning, designing and configuring arrangements of various components, i.e. for defining the spatial arrangement of structural components relative to each other, and for optimizing the same with respect to the functional position and/or the number or quantity thereof. The invention further relates to an automated method of generating production documents, and especially construction or build documents such as drawings and/or parts lists for production integration and for documentation purposes. These methods especially pertain to the planning, design and production of an aircraft, for example.

For each individual customer of an aircraft manufacturer, specific production documents must be produced and provided, for defining the arrangements of various components of the aircraft, the integration thereof into the other structures of the aircraft, and for purposes of customer documentation. An example can be given in the context of the planning, design and production of a service or supply channel in an aircraft cabin (i.e. a channel below the overhead baggage compartments in the aircraft cabin, adapted to receive passenger service units (PSUs) and the like therein), as well as the passenger service and information units installed therein. In this context, the required production documents relate to preliminary video investigations (type, number and installation positions of video components), a plotter plan (an overview of connections of the passenger service channel components), as well as the installation drawings and parts lists relating to the passenger service units to be installed in the channel.

For preparing these documents, the cabin layout is the general basis or starting point for laying-out and designing the baggage compartments and the service channel. In this context, the service channel is arranged as a component of the aircraft cabin, below the right and left overhead baggage compartments. Various different units or devices are installed in the service channel, forming a rowed arranged of various passenger service units, oxygen supply boxes, lights, illuminatable indicators and displays, loudspeakers, air vents, video monitors or screens, selector switches such as attendant call buttons, etc., as requested by the particular customer, i.e. purchaser of the aircraft. These various devices installed in the service channel provide information, instructions, lighting, air, video entertainment, and oxygen in the case of an emergency, to the passengers in the aircraft.

It is known to manually rearrange and then document new constructions or arrangements of previously existing solutions or principles as well as available components to accommodate a particular arrangement required by a customer. This is achieved, for example, by using technical administrative systems (e.g. production planning systems—PPS) for preparing parts lists and the like, and by using computer aided design (CAD) systems for preparing drawings. Various design steps are carried out separately, and the various documents are prepared separately, using separate tools and support systems. In this manner, the spatial arrangements of the components are fixed and specified, often in an iterative manner involving revisions to accommodate the customer's requests as well as production limitations, ergonomics, economics, etc.

This conventional process is especially achieved by applying the knowledge and experience of the aircraft designer and builder at each stage, regarding the particular aircraft type and the production-related integration characteristics, such as for example, dimensions, doors, and requirements of the fabrication or production area, possible available systems and connections, the customer-specific cabin layout requirements, the class distribution or layout of the cabin, seat types, galley positions, toilet positions, specialized installations in the aircraft cabin, regulatory agency requirements, design requirements, ergonomics and comfort requirements (e.g. the reach distance of a seated passenger or air draft conditions), as well as commercial or economic demands. The required drawings are manually prepared by means of CAD systems, and the number of the various components is counted out and then manually documented in parts lists.

The above described conventional processes are rather inefficient and complicated, because they require separate steps that involve at least partial duplication of effort, and do not make use of common or overlapping information and requirements among the separate steps or processes. It also becomes difficult, time consuming and expensive to carry out design revisions as a result of customer requests, or to adapt a design proposal to manufacturing requirements or limitations, for example.

SUMMARY OF THE INVENTION

In view of the above, it is an object of the invention to provide a system for the above described general type, whereby the arrangement of the components is automatically configured in an overall integrated manner, and to the extent required, production documents (such as drawings, parts lists, supplementing or completing evaluations, e.g. device and equipment lists or mass distribution plans) are automatically prepared by means of a data processing program. The invention further aims to avoid or overcome the disadvantages of the prior art, and to achieve additional advantages, as apparent from the present specification.

The above objects have been achieved according to the invention in a system for automatically configuring an arrangement of several components, i.e. defining the spatial arrangement of the components relative to each other, and also optimizing the functional position and/or the number or quantity of the components. In the system the basic aircraft type underlying the construction documents or build documents is input into a configuration tool of a data processing system. The aircraft-specific geometry is stored in, and then automatically loaded and depicted from, a drawing module of the data processing system. The required geometric objects or components are determined and mathematically described, and position rules are mathematically depicted and stored, by a function and data analysis, and are then provided and combined with the aircraft-specific geometry in the drawing module of the data processing system. Finally, in the configuration tool of the data processing system, the objects or components on the one hand, as well as the aircraft-specific geometry on the other hand, are automatically spatially configured relative to one another in an optimal manner according to a defined rule set that takes into account the particular customer requirements.

A further detailed embodiment of the invention involves inputting project-related data and then generating production documents by a computer program in a generating tool of the data processing system. Thereupon, the production documents can be output as substantially conventional documents, such as drawings, parts lists, etc.

A particular embodiment of the inventive system relates to the example of planning and designing the area of a service channel, e.g. for passenger service units, in an aircraft cabin. In this context, the required production documents preferably comprise documents for video preliminary investigations, plotter plans, assembly and installation construction documents or build documents such as drawings, parts lists, or the like. The data used to generate the drawings and other documents can also be provided as control data directly to numerically controlled production equipment and tools for carrying out at least some of the production steps.

Especially according to the invention, the specific cabin layout for a particular customer, with its particular layout and arrangement of components such as galleys, toilets, storage closets or cabinets, seats, and the like forms a basis for an automatic designing or laying-out of the installation components and the service channel, by inputting a position in the cabin (orientation input) into the project cabin layout, and then adding or combining this information with the aircraft-specific geometry. Moreover, surrounding installations or components for the service channel that influence the cabin layout, are parametrically described and then added or introduced to the total or overall project. Furthermore, for a prescribed configuration of the surrounding installations and a prescribed cabin layout, the service channel will be automatically configured according to a defined rule set that takes into account the customer requirements.

The cabin layout is the underlying basis for the automatic layout or design of the baggage compartments and the service channel. In this context, according to the invention, a so-called cabin component reference database with parametrically predefined components is provided for defining the cabin layout. The parametric definition of these components advantageously allows the respective definition of essentially any new components to be added to the reference database as needed or desired. Via a user interface surface, any desired or required components can be selected out of this database by a user, and can then be inserted into the cabin layout simply by inputting the respective position and, if required, an orientation of each respective selected component. In addition to the automatic configuration of the service channel for a given baggage compartment configuration and a given cabin layout, partial areas of the cabin in which special configurations are required and which cannot be automatically produced, may advantageously be manually configured.

Further detailed features and preferred embodiments of the invention are described in the remainder of this specification.

An essential advantage of the system according to the invention is that the special knowledge which is necessary for the above mentioned and other similar construction tasks, and which constantly repeats itself while carrying out such tasks, is taken up, documented, and thereby retained or conserved and repeatedly brought into application in an automated method for generating production documents.

Thereby, the aircraft designer and builder is relieved of the burden of routine tasks, because these routine tasks and knowledge are automated, and instead can apply his or her work efforts to the higher level design, assembly and construction tasks.

Further advantages of the inventive system include a considerable reduction in project lead times and throughput and completion times, a reduction of construction effort and expense, an increase in the substantive productivity of the design and production personnel, as well as an increase in finished product quality. It is further advantageous that the inventive method makes it possible to very easily investigate, develop and compare different variations of design concepts and layouts for optimizing the results in view of aspects such as safety, customer needs and utilization, costs, ergonomics, and the like. Also, any conflicts or discrepancies of the design results relative to regulations and restrictions can be automatically monitored, tested and visualized.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
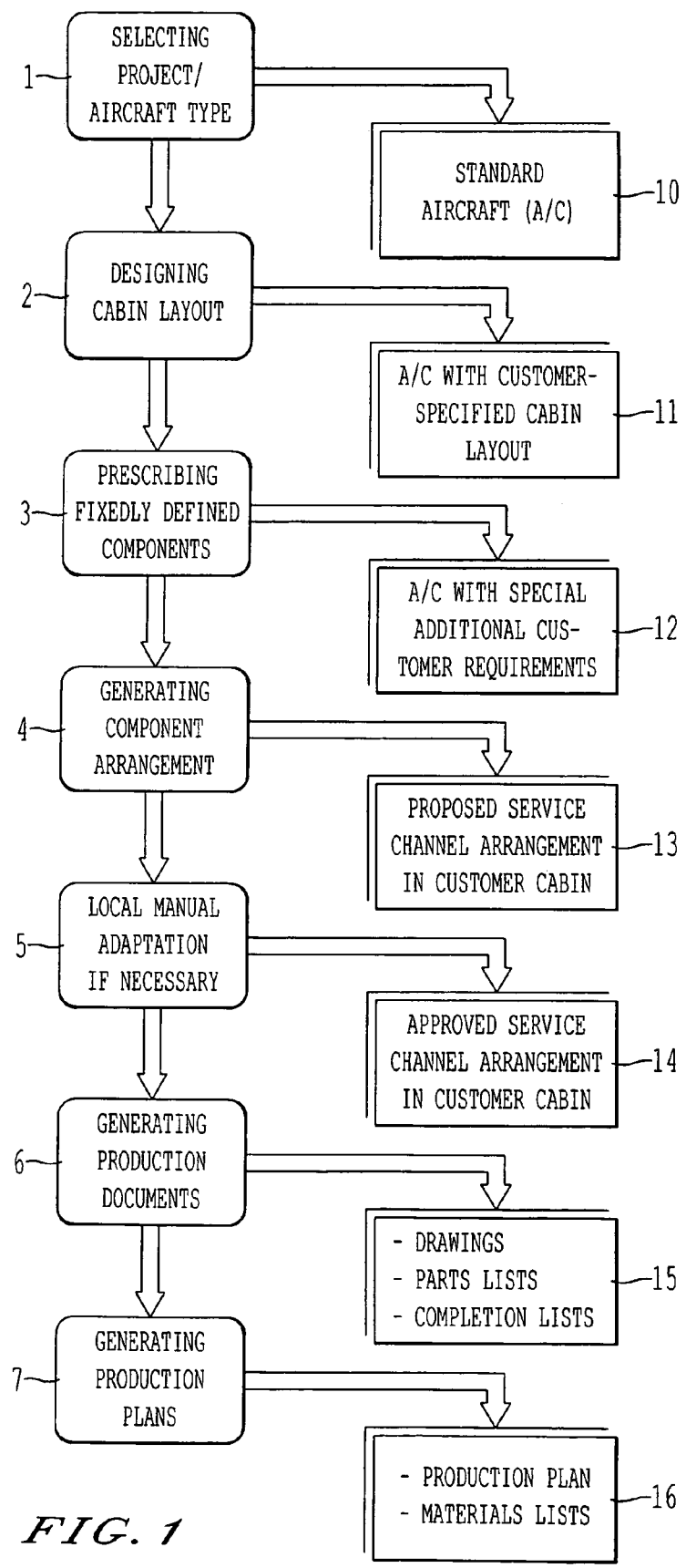
FIG. 1 is a process plan or flow chart for the automatic configuration of component arrangements and for the automatic preparation of production documents, for the area of a service channel in an aircraft cabin.

The schematic flow diagram shown in FIG. 1 includes a left sequence or column of blocks 1 to 7, which each respectively represent one respective method step of the inventive method for a single individual system. The flow diagram of FIG. 1 further includes a right column of blocks 10 to 16, which each respectively represent an intermediate result and/or output, respectively associated with each one of the method step blocks 1 to 7 of the left column.

At the start of the method, the particular aircraft being worked on, i.e. the particular aircraft type underlying and associated with the build and production documents, must be input into the system. This is represented in the top block 1, which involves the first method step of selecting the project, e.g. the particular aircraft type and the design project that is to be carried out therein, for example the configuration of a service channel according to the desires or specifications of a particular customer. Carrying out the first method step of block 1 achieves an intermediate result that is illustrated or represented in block 10, namely the selection and representation of a standard aircraft (A/C) from a set of available standard aircraft definitions. Each standard aircraft definition relates to a particular aircraft type of the manufacturer, and includes, for example, a complete definition of all dimensions, positions, orientations, and relative arrangements of all parts or components making up the standard basic aircraft type, or at least the components and portions of the aircraft that are relevant for the selected project, for example of the passenger cabin interior.

The second method step represented in block 2 relates to the design and construction of the general cabin layout, as given by the definition of individual components and assemblies in the cabin, such as galleys, toilets, storage areas, as well as electrical and electronic resources or other service resources. The intermediate result of this step of block 2 is indicated in the intermediate result block 11, which represents an aircraft outfitted with a customer-specific cabin layout.

Block 3 represents the third method step, which involves specifying the arrangement of fixedly defined and mandatory components, such as movable passenger class dividers, LCD display screens, or the like, which will have an influence on the possible or permissible configuration of other components. The intermediate result shown in block 12 is an aircraft outfitted with special customer-required components within the customer-specific cabin layout.

As an alternative to designing and building a new cabin layout for particular customer needs, it is possible to load and utilize a pre-existing standard layout or an externally developed cabin layout. In any event, such an alternative layout can be read or loaded into the system carrying out the inventive method, through an interface with block 2 or block 3.

The fourth method step shown in block 4 actually generates the arrangement of the components, such as passenger service units in the service channel, for example. The intermediate result of this step represented in block 13 is a proposal for the arrangement of these components, such as the passenger service units, within the customer-specific cabin layout.

To the extent necessary, a manual local adaptation or adjustment of the proposal of block 13 as generated by method step 4 can be carried out in method step 5. The intermediate result of such a special adjustment or adaptation is shown in block 14 and represents a customer-accepted new arrangement of the passenger service units in the service channel of the customer-specific cabin layout.

Once the proposed special configuration and layout has been finalized and approved, method step 6 (represented in block 6) involves the preparation or generation of the production documents such as drawings, parts lists, and/or supplemental or completion lists. This sixth method step leads to the intermediate result shown in block 15, namely the generated drawings, parts lists and completion lists.

The final seventh step shown in block 7 involves the preparation or generation of the production plan, with a build plan, production contracts, materials lists, and the like, which are represented in the intermediate result block 16.

In a further embodiment of the invention, documents for other systems and components of the aircraft can be generated in the same method process as described above. For example, such other systems and components of the aircraft may include an emergency lighting system comprising an escape path lighting system, a carpet layout plan with individual carpet piece or section drawings, electrical cabling, pipe and conduit arrangements, and the like. These individual systems of the aircraft are each respectively dealt with in individual modules.

Figure 2:
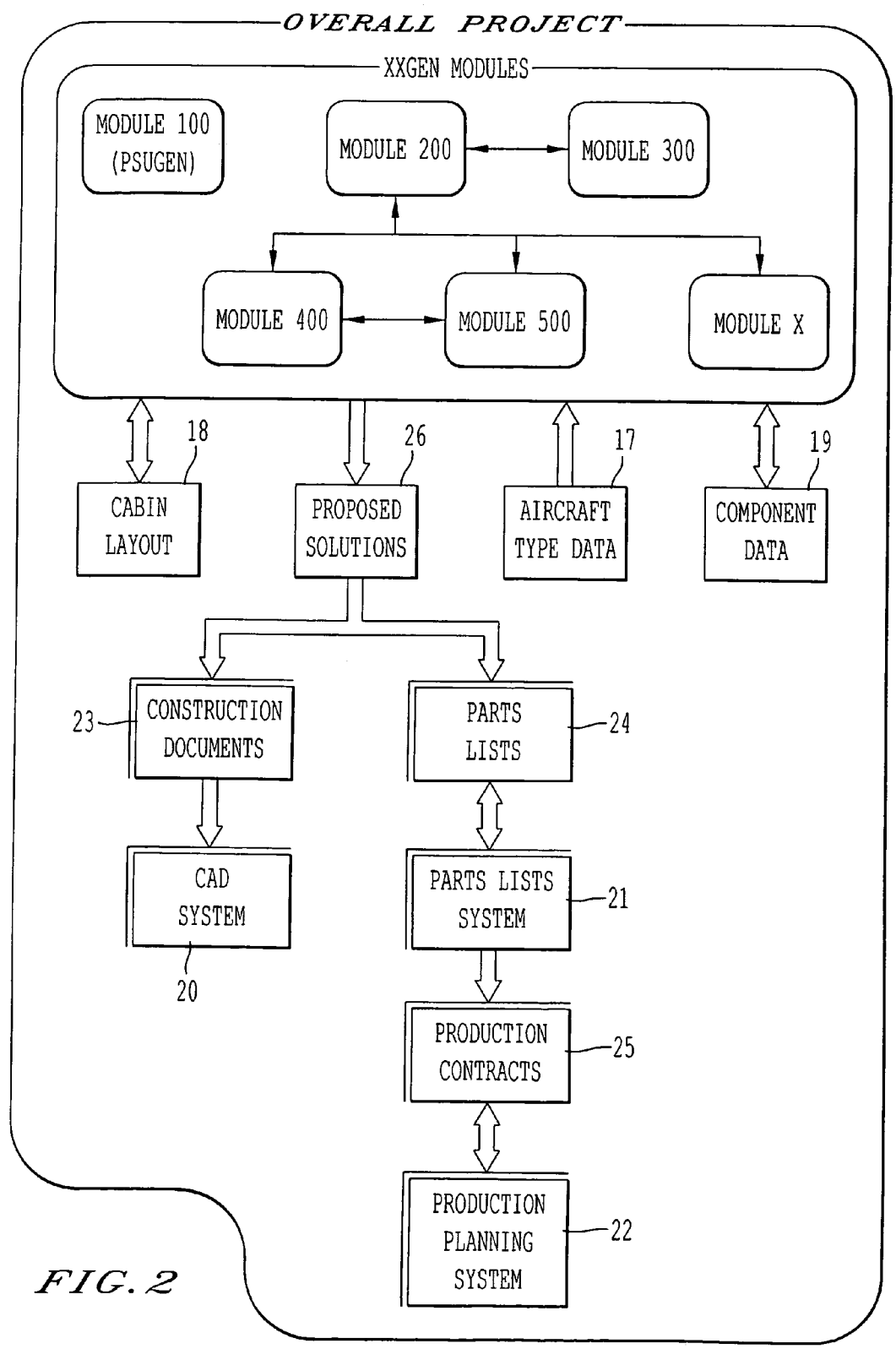
FIG. 2 is a block model diagram of the general structure of a total system for carrying out the inventive method, including several associated elements or modules and databases, as well as the generated documents.

As shown schematically in FIG. 2, all of the modules 100, 200, 300, 400, 500 up to module X all are connected to and have access to the constant parameters defining the selected or input aircraft type, which are stored in a memory of an aircraft type database 17. These data defining the general or standard aircraft type are always the same independent of the particular customer. Furthermore, each of the individual modules 100, 200, 300, 400, 500 up to X are connected to and access a common customer-specific cabin layout database 18 in which the customer-specific cabin layout is stored. In other words, the database 18 contains all data or parameters necessary for completely describing or defining all relevant cabin components and installations for a prescribed project, on which all of the modules are working concurrently or in common. Each module inputs certain parameters into the database 18 or queries and calls up those parameters that it needs from the database 18. Moreover, the relevant data defining individual components for generating the construction or build documents 23 and the parts lists 24 are stored in a component reference database 19, to which each of the modules also has two-way access.

As a result of the processing method being carried out, each module automatically generates a solution proposal 26, which is displayed or otherwise provided to the user. The user then has the possibility to manually modify or adjust this solution proposal 26. This solution proposal, which has been modified as necessary, is further coupled to a computer aided design (CAD) system 20 through a plot script which is not illustrated, i.e. the solution proposal is transferred to a parallel operating CAD system 20, where it is displayed and then output as a substantially conventional drawing. The parts lists 24 and the production contracts 25 are also output and transferred through respective defined interfaces automatically into the available parts list system 21 and the production planning system 22.

The inventive system is used to automatically configure component arrangements, i.e. to automatically define the spatial arrangement of structural components relative to each other, and the optimization thereof with respect to their functional positions (for example the visibility and/or reachability of components that must be accessed by passengers) and/or with respect to regulations and other requirements limiting the allowable arrangements, and/or with respect to the quantity or number of the components. This system is an automated system in which the constantly repeated special knowledge of the designer and builder of a component arrangement (such as an aircraft cabin) is formulated as a system of data and rules, which is then documented and can be repeatedly called-up and applied as needed in an automated manner for repetitious similar applications or other applications that share similar components, restrictions, and the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A data processing system defining a spatial arrangement of structural components relative to each other within an installation space, comprising:

an input configured to input general parameters of a selected installation space into a configuration tool, said configuration tool including a processor connected to a database and a drawing module, wherein:

said database is configured to store first data defining a space-specific geometry of said selected installation space, to load and display said first data in said drawing module, and to store second data respectively defining, geometrically, structural components that are to be arranged in said selected installation space; and said processor is configured to provide said second data together with said first data into said drawing module, to provide a rule set defining at least customer-specific requirements of a customer for whom said structural components are to be arranged in said installation space, and to process said first data and said second data together according to said rule set in said configuration tool so as to automatically define a spatial arrangement of said structural components relative to each other within said installation space.

2. The system according to claim 1, wherein said processor is configured to optimize a configuration of said structural components relative to each other within said installation space with respect to at least one of a functional position of each one of said structural components and a quantity of said structural components arranged in said installation space.

3. The system according to claim 1, wherein said processor is configured to perform functional and data analyses so as to mathematically describe said structural components and to mathematically represent said structural components according to position rules.

4. The system according to claim 1, further comprising a document generating tool including a processing program, wherein said processor is configured to use said generating tool and generate production documents including at least one of drawings, parts lists, materials lists, video preliminary examinations, plotter plans, installation plans, production plans, or production contracts, corresponding to said spatial arrangement defined by said processor.

5. The system according to claim 4, wherein:
said production documents include said drawings; and
said processor is configured to transfer drawing data representing said drawings via a plot script from said document generating tool to a computer aided design (CAD) output system that outputs said drawings.

6. The system according to claim 4, wherein said processor is configured to transfer said production documents via an interface from said document generating tool to a technical administrative system.

7. The system according to claim 6, wherein said technical administrative system comprises a production planning system.

8. The system according to claim 1, wherein said selected installation space comprises at least one partial space within an aircraft cabin of a selected aircraft type.

9. The system according to claim 8, wherein:
said at least one partial space within said aircraft cabin comprises a service channel in said aircraft cabin; and
said structural components to be installed in said service channel include any one or more of passenger service units, lights, air vents, loudspeakers, oxygen supply units, video monitors, informational displays, or control switches.

10. The system according to claim 8, wherein said database loads a data set defining a customer-approved preliminary cabin layout into said data processing system through a data input interface.

11. The system according to claim 9, wherein:
said database is further configured to store third data respectively defining additional cabin outfitting components including one or more of galleys, toilets, storage cabinets, passenger seats, or baggage compartments arranged according to a customer-specified cabin layout; and
said processor is configured to process said third data together with said first data and said second data according to said rule set to define said spatial arrangement of said structural components.

12. The system according to claim 9, wherein:
said database stores said second data in a component reference database that contains data defining plural different available structural components; and
said second data are selected and read out from said component reference database.

13. The system according to claim 9, wherein:
said at least one partial space within said aircraft cabin further comprises another space other than said service channel in said aircraft cabin; and
said processor further defines a spatial arrangement of other components within said another space.

14. The system according to claim 11, wherein:
said database is further configured to store fourth data respectively defining surrounding components including one or more of cabin dividers, baggage compartments, video monitors, or display screens of which the arrangement will limit a possible range of variants of said spatial arrangement; and
said processor is configured to process said fourth data together with said first data, said second data, and said third data according to said rule set to define said spatial arrangement of said structural components.

15. The system according to claim 11, wherein said third data are selected and read out from a cabin outfitting component reference database in which said third data are stored among data defining plural different available cabin outfitting components.

16. The system according to claim 14, wherein said surrounding components include said baggage compartments, which further serve as carriers for equipment and for electrical interfaces of said service channel.

17. The system according to claim 16, wherein:
said fourth data define said baggage compartments as a row of successive ones of said baggage compartments; and
said processor automatically adapts said fourth data defining said row of baggage compartments according to said rule set.

18. The system according to claim 1, wherein said database stores said second data in at least one reference database that contains parametric data defining various different structural components.

19. The system according to claim 1, wherein said installation space is a space within a transport vehicle other than an aircraft.

20. The system according to claim 1, wherein said installation space is an industrial plant, and said arrangement of structural components forms assembled equipment in said plant.

21. The system according to claim 1, wherein said processor is configured to optimize a configuration of said structural components relative to each other within said installation space with respect to both a functional position of each one of said structural components and a quantity of said structural components arranged in said installation space.

22. The system according to claim 1, further comprising a document generating tool including a processing program, wherein said processor is configured to use said document generating tool and generate production documents including drawings and at least one of parts lists, materials lists, video preliminary examinations, plotter plans, installation plans, production plans, or production contracts, corresponding to said spatial arrangement defined by said processor.

23. The system according to claim 1, wherein said installation space is a space within an aircraft.

24. The system according to claim 1, wherein said installation space is an aircraft industrial plant, and said arrangement of structural components forms assembled aircraft equipment in said aircraft industrial plant.

25. A data processing system defining a spatial arrangement of structural components relative to each other within an installation space, comprising:
    means for configuring aspects of said structural components and said installation space;
    means for drawing aspects of said structural components and said installation space;
    means for inputting general parameters of a selected installation space into said means for configuring;
    means for storing first data defining a space-specific geometry of said selected installation space, for loading and displaying said first data in said means for drawing, and for storing second data that respectively geometrically define structural components that are to be arranged in said selected installation space; and
    means for processing said second data together with said first data in said means for drawing, for providing a rule set that defines at least customer-specific requirements of a customer for whom said structural components are to be arranged in said installation space, and for processing said first data and said second data together according to said rule set in said means for configuring so as to automatically define a spatial arrangement of said structural components relative to each other within said installation space, wherein
    said means for configuring includes said means for processing and said means for processing are connected to said means for storing and said means for drawing.

26. The system according to claim 25, wherein said means for processing is configured to optimize a configuration of said structural components relative to each other within said installation space with respect to at least one of a functional position of each one of said structural components and a quantity of said structural components arranged in said installation space.

27. The system according to claim 25, wherein said means for processing is configured to perform functional and data analyses so as to mathematically describe said structural components and to mathematically represent said structural components according to position rules.

28. The system according to claim 25, further comprising means for generating a document including a processing program, wherein said means for processing is configured to use said means for generating and generate production documents including at least one of drawings, parts lists, materials lists, video preliminary examinations, plotter plans, installation plans, production plans, or production contracts, corresponding to said spatial arrangement defined by said means for processing.

29. The system according to claim 28, wherein:
    said production documents include said drawings; and
    said means for processing is configured to transfer drawing data representing said drawings via a plot script from said document generating tool to a computer aided design (CAD) output system that outputs said drawings.

30. The system according to claim 28, wherein said means for processing is configured to transfer said production documents via an interface from said document generating tool to a technical administrative system.

31. The system according to claim 30, wherein said technical administrative system comprises a production planning system.

32. The system according to claim 25, wherein said selected installation space comprises at least one partial space within an aircraft cabin of a selected aircraft type.

33. The system according to claim 32, wherein:
    said at least one partial space within said aircraft cabin comprises a service channel in said aircraft cabin; and
    said structural components to be installed in said service channel include any one or more of passenger service units, lights, air vents, loudspeakers, oxygen supply units, video monitors, informational displays, or control switches.

34. The system according to claim 32, wherein said means for storing loads a data set defining a customer-approved preliminary cabin layout into said data processing system through a data input interface.

35. The system according to claim 33, wherein:
    said means for storing further stores third data respectively defining additional cabin outfitting components including one or more of galleys, toilets, storage cabinets, passenger seats, or baggage compartments arranged according to a customer-specified cabin layout; and
    said means for processing is configured to process said third data together with said first data and said second data according to said rule set to define said spatial arrangement of said structural components.

36. The system according to claim 33, wherein:
    said means for storing stores said second data in a component reference database that contains data defining plural different available structural components; and
    said second data are selected and read out from said component reference database.

37. The system according to claim 33, wherein:
    said at least one partial space within said aircraft cabin further comprises another space other than said service channel in said aircraft cabin; and
    said means for processing further defines a spatial arrangement of other components within said another space.

38. The system according to claim 35, wherein:
    said means for storing further stores fourth data respectively defining surrounding components including one or more of cabin dividers, baggage compartments, video monitors, or display screens of which the arrangement will limit a possible range of variants of said spatial arrangement; and
    said means for processing is configured to process said fourth data together with said first data, said second data, and said third data according to said rule set to define said spatial arrangement of said structural components.

39. The system according to claim 35, wherein said third data are selected and read out from a cabin outfitting component reference database in which said third data are stored among data defining plural different available cabin outfitting components.

40. The system according to claim 38, wherein said surrounding components include said baggage compartments, which further serve as carriers for equipment and for electrical interfaces of said service channel.

41. The system according to claim 40, wherein:
said fourth data define said baggage compartments as a row of successive ones of said baggage compartments; and
said means for processing automatically adapts said fourth data defining said row of baggage compartments according to said rule set.

42. The system according to claim 25, wherein said means for storing stores said second data in at least one reference database that contains parametric data defining various different structural components.

43. The system according to claim 25, wherein said installation space is a space within a transport vehicle other than an aircraft.

44. The system according to claim 25, wherein said installation space is an industrial plant, and said arrangement of structural components forms assembled equipment in said plant.

45. The system according to claim 25, wherein said processor is configured to optimize a configuration of said structural components relative to each other within said installation space with respect to both a functional position of each one of said structural components and a quantity of said structural components arranged in said installation space.

46. The system according to claim 25, further comprising means for generating a document including a processing program, wherein said means for processing is configured to use said means for generating and generate production documents including drawings and at least one of parts lists, materials lists, video preliminary examinations, plotter plans, installation plans, production plans, or production contracts, corresponding to said spatial arrangement defined by said means for processing.

47. The system according to claim 25, wherein said installation space is a space within an aircraft.

48. The system according to claim 25, wherein said installation space is an aircraft industrial plant, and said arrangement of structural components forms assembled aircraft equipment in said aircraft industrial plant.

* * * * *